US010488094B2

(12) United States Patent
Burk et al.

(10) Patent No.: US 10,488,094 B2
(45) Date of Patent: Nov. 26, 2019

(54) SORPTION MODULE

(71) Applicant: Mahle International GmbH, Stuttgart (DE)

(72) Inventors: Roland Burk, Stuttgart (DE); Lars Ludwig, Altbach (DE)

(73) Assignee: Mahle International GmbH (DE)

( * ) Notice: Subject to any disclaimer, the term of this patent is extended or adjusted under 35 U.S.C. 154(b) by 89 days.

(21) Appl. No.: 15/534,481

(22) PCT Filed: Nov. 30, 2015

(86) PCT No.: PCT/EP2015/078003
§ 371 (c)(1),
(2) Date: Jun. 8, 2017

(87) PCT Pub. No.: WO2016/091628
PCT Pub. Date: Jun. 16, 2016

(65) Prior Publication Data
US 2017/0343262 A1 Nov. 30, 2017

(30) Foreign Application Priority Data
Dec. 10, 2014 (DE) .................. 10 2014 225 410

(51) Int. Cl.
*F25B 49/04* (2006.01)
*F25B 17/08* (2006.01)
(Continued)

(52) U.S. Cl.
CPC ............ *F25B 49/046* (2013.01); *F25B 17/00* (2013.01); *F25B 17/08* (2013.01); *F25B 17/086* (2013.01);
(Continued)

(58) Field of Classification Search
CPC ...... F25B 49/046; F25B 37/00; F25B 17/086; F25B 35/04; F25B 49/04; F25B 17/08; F28C 3/14
(Continued)

(56) References Cited

U.S. PATENT DOCUMENTS 3,558,920 A * 1/1971 Giaever ................ H03K 17/78
250/214.1
3,952,263 A * 4/1976 McArthur ............... H01S 3/03
359/345
(Continued)

FOREIGN PATENT DOCUMENTS

DE 3435630 C1 5/1986
DE 19730698 A1 1/1999
(Continued)

OTHER PUBLICATIONS

English abstract for DE-3435630.
(Continued)

*Primary Examiner* — David J Teitelbaum
(74) *Attorney, Agent, or Firm* — Fishman Stewart PLLC

(57) ABSTRACT

A sorption module for a sorption temperature-control device may include a housing enclosing a working chamber. A sorption zone and a phase change zone may be arranged in the working chamber where a working medium is displaceable reversibly between the sorption zone and the phase change zone. A sorption structure may be arranged in the sorption zone, and a phase change structure may be arranged in the phase change zone. An outer wall of the housing may include a double-walled section that may provide a cavity between an outer wall part and an inner wall part of the double-walled section, and the phase change zone may be arranged on an inner side of the inner wall part.

19 Claims, 5 Drawing Sheets

(51) Int. Cl.
*F25B 17/00* (2006.01)
*F25B 35/00* (2006.01)
*F25B 35/04* (2006.01)
*F25B 37/00* (2006.01)
*F25B 39/00* (2006.01)
*F28C 3/14* (2006.01)

(52) U.S. Cl.
CPC .............. *F25B 35/00* (2013.01); *F25B 35/04* (2013.01); *F25B 37/00* (2013.01); *F25B 39/00* (2013.01); *F25B 49/04* (2013.01); *F28C 3/14* (2013.01); *Y02A 30/276* (2018.01)

(58) Field of Classification Search
USPC .......................................................... 165/84
See application file for complete search history.

(56) References Cited

U.S. PATENT DOCUMENTS

| | | | | |
|---|---|---|---|---|
| 3,961,720 | A * | 6/1976 | Potter, Jr. ................ | A47J 41/02 215/12.2 |
| 5,291,942 | A * | 3/1994 | Ryan ....................... | F25B 17/08 165/104.12 |
| 6,336,408 | B1 * | 1/2002 | Parrott .................. | E21B 36/001 102/312 |
| 2008/0277162 | A1 * | 11/2008 | DiFoggio .............. | E21B 47/011 175/17 |
| 2012/0055661 | A1 * | 3/2012 | Feher ...................... | F28D 20/02 165/181 |
| 2012/0279068 | A1 * | 11/2012 | Mahefkey ............. | F28D 15/046 29/890.032 |
| 2013/0206363 | A1 * | 8/2013 | Kirk ......................... | F28F 7/00 165/84 |
| 2013/0306656 | A1 * | 11/2013 | Eckhoff .................. | F25D 3/125 220/592.26 |

FOREIGN PATENT DOCUMENTS

| | | |
|---|---|---|
| DE | 19834696 A1 | 2/2000 |
| DE | 10047503 A1 | 4/2002 |
| DE | 102004049411 A1 | 4/2006 |
| EP | 1278028 A2 | 1/2003 |
| EP | 1918668 A1 | 5/2008 |
| WO | WO-2007068418 A1 | 6/2007 |
| WO | WO-2007/139476 A1 | 12/2007 |
| WO | 2012/041265 A2 | 4/2012 |
| WO | WO-2013011102 A2 | 1/2013 |

OTHER PUBLICATIONS

English abstract of EP-1278028.
English abstract for DE-19730698.
English abstract for DE-19834696.
English abstract for EP-1918668.
German Search Report dated Aug. 13, 2015 related to corresponding German Patent Application No. 10 2014 225 410.8.

* cited by examiner

SORPTION MODULE

CROSS-REFERENCE TO RELATED APPLICATIONS

This application claims priority to German Patent Application No. 10 2014 225 410.8, filed on Dec. 10, 2014, and International Patent Application No. PCT/EP2015/078003, filed Nov. 30, 2015, the contents of which are hereby incorporated by reference in their entirety.

TECHNICAL FIELD

The present invention relates to a sorption module for a sorption temperature-control device. The invention additionally relates to a sorption temperature-control device fitted with at least one such sorption module.

BACKGROUND

A generic sorption module is known from WO 2013/011102 A2 which comprises a sorption zone and a phase change zone in a working chamber. Located in the sorption zone is a sorption structure which is coupled to a sorption path for guiding a sorption path medium in a heat-transmitting manner. Located in the phase change zone is a phase change structure which is coupled to a phase change path for guiding a phase change path medium in a heat-transmitting manner. The housing encloses the sorption zone and the phase change zone and is used to tightly receive a working medium which is displaceable between the sorption zone and the phase change zone according to the operating phase of the sorption module.

In the known sorption module, the sorption structure and the phase change structure are each designed as quadrangular blocks which are arranged next to one another in the housing so that the housing also has a quadrangular shape. During a cooling phase which can also be designated as usage process, the working medium located in the phase change zone in the liquid state evaporates. The heat of evaporation required for this is supplied to the phase change structure via the phase change path and the phase change path medium. The phase change structure works as an evaporator in this case and enables a cooling of the phase change path medium. The vaporized gaseous working medium passes into the sorption zones as a result of the prevailing differential pressures and is adsorbed there by the sorption structure. The sorption heat required for this is transmitted from the working medium to the sorption structure and can be removed via the sorption path and the sorption path medium. The sorption structure which works as an adsorber in this case thereby enables a heating of the sorption path medium. During a heating phase which can also be designated as regeneration process, heat is introduced via the sorption path into the sorption structure on the other hand, with the result that the absorbed working medium is desorbed from the sorption structure, i.e. is released from this again. The sorption structure then works as a desorber and thereby enables a cooling of the sorption path medium. The gaseous or vaporous working medium in this case passes from the sorption zone to the phase change zone as a result of the pressure gradients now prevailing in the working chamber. At the phase change structure the gaseous working medium can condense, whereby it releases heat of condensation to the phase change structure. Excess heat can be removed via the phase change path. The phase change structure here operates as a condenser and thus enables a heating of the phase change path medium.

These sorption modules or sorption temperature-control devices require comparatively little electrical energy since in particular no compression pump is required.

Known from WO 2007/068418 A1 is another sorption module which however has a different structure. There a plurality of hollow elements are arranged in parallel in a block, wherein each hollow element contains a sorption zone and a phase change zone and encloses a corresponding volume of working medium in hermetically sealed form. The sorption zones of all the hollow elements are coupled to a common sorption path in a heat-transmitting manner whilst the phase change zones of all the hollow elements are coupled to a common phase change path in a heat-transmitting manner. An additional housing which encloses a working chamber to accommodate the working medium is not required here.

SUMMARY

The present invention is concerned with the problem of providing an improved embodiment for a generic sorption module or for a sorption temperature-control device fitted therewith, which is in particular characterized by an increased energy efficiency.

This problem is solved according to the invention by the subject matter of the independent claim(s). Advantageous embodiments are the subject matter of the dependent claims.

The invention is based on the general idea to configure an outer wall of the housing which separates the working chamber from the surroundings of the housing, at least in part, i.e. at least in one section, as double-walled so that the outer wall in the double-walled section comprises an outer wall which is exposed to the surroundings and an inner wall which is exposed to the working chamber. Furthermore, the outer wall is configured in the double-walled section so that a cavity is formed between the outer wall and the inner wall. The phase change path is now guided through this cavity. Furthermore, it is proposed to arrange the phase change zone and therefore ultimately the phase change structure on an inner side of the inner wall. Since the outer wall in the double-walled section becomes an active component of the sorption module due to the integration of the phase change path, passive components, in particular passive wall sections are reduced inside the sorption module. This increases the power density of the sorption module. It is particularly advantageous in this case to arrange the phase change zone and therefore ultimately the phase change structure on the inner side of the inner wall in a heat-transmitting manner, in particular by means of a flat and/or pre-tensioned contact.

In particular during the heating phase an external condensation of the working medium can take place on an outer wall. In the conventional design, the heat of condensation thereby delivered to the outer wall cannot be removed via the phase change path but is emitted as lost heat from the housing into the surroundings. Such external condensation is undesirable for several reasons. On the one hand, some of the condensation heat is lost without being used, on the other hand the condensate deposited on the wall surfaces is no longer available to a subsequent usage process with re-evaporation taking place to produce cold. In the sorption module presented here however, condensation can also take place on the inner side of the outer wall. As a result of the integration of the phase change path in the outer wall, however the heat of condensation thereby released can be removed via the phase change path with the result that the previously described disadvantages of the unused heat of condensation and condensate loss can be largely avoided.

The respective sorption structure in the present context is expediently provided additionally or separately to a wall which delimits the sorption zone and on which the sorption structure can be arranged. The respective phase change structure is in the present context expediently provided additionally or separately to a wall which delimits the phase change zone and on which the phase change structure can be arranged.

According to an advantageous embodiment, the sorption zone can be enclosed by the phase change zone in a circumferential direction of the housing. The circumferential direction can in this case relate to a longitudinal central axis of the housing. In relation to this longitudinal central axis, the sorption zone is accordingly arranged radially inside the phase change zone. Furthermore, it is proposed to configure the double-walled section of the outer wall so that it encloses the phase change zone in the circumferential direction. In relation to the longitudinal central axis, the phase change zone is therefore arranged radially between the sorption zone and the double-walled section of the outer wall. The phase change path is now integrated in the double-walled section so that the phase change zone is enclosed by the phase change path in the circumferential direction. Accordingly, in relation to the longitudinal central axis of the housing, the phase change zone is located radially between the sorption zone and the phase change path. As a result of this design, power-reducing losses of the sorption module can be largely reduced.

Particularly advantageous is a further development in which the housing is configured to be cylindrical and has a jacket which extends in the circumferential direction in relation to the longitudinal central axis and which forms or comprises the double-walled outer wall or the double-walled section of the outer wall. Such a cylindrical structure is also characterized by a particularly high power density. In particular, such a cylindrical housing requires a relatively small outer wall compared to a quadrangular housing. Accordingly, thermal losses due to convection and thermal irradiation of the outer wall can be reduced. The cylindrical housing can have a circular cross-section or an elliptical or oval cross-section.

According to another embodiment, at least one spring element can be provided which pre-tensions the phase change structure against the inner wall. The higher this contact pressure, the better is the heat transfer as a result of heat conduction. In this case, in principle a direct contact between phase change structure and inner wall can be provided. It is also feasible to arrange a heat conducting layer between phase change structure and inner wall, for example, in the form of a heat-conducting paste. It is also feasible to adhesively bond the phase change structure to the inner wall. Preferably a heat-conducting adhesive can be used here. A solder connection between phase change structure and inner wall is also feasible. As a result of the pre-tension, a contact pressure is produced which continuously presses the phase change structure against the inner wall or only during application.

The spring element can, for example, be a spring strap which is wound in a circumferential direction of the housing around a longitudinal central axis of the housing in a helical manner. Such a helical spring element is preferably used when the housing is cylindrical. The helical spring element then extends along the jacket of the housing. Such a spring element can be mounted particularly simply.

Alternatively, the spring element can be a spring plate which is bent in the circumferential direction of the housing about the longitudinal central axis of the housing. This variant is preferably also used in a cylindrical housing. The spring plate is then also cylindrically shaped, This also results is a simple mounting with efficient pre-tension.

According to an advantageous further development, the spring element can be perforated so that the sorption zone is fluidically connected to the phase change zone through the spring element in a direct radial path. In this way, working medium evaporated during operation of the sorption module can pass particularly simply from the phase change zone to the sorption zone or conversely.

According to another advantageous embodiment, the phase change structure can be configured in a band shape and extend helically along the outer wall around the longitudinal central axis of the housing. In particular, a single continuous band can be used in order to form the phase change structure. This can be an advantage from the production technology viewpoint. Such an embodiment is particularly suitable for a vertical arrangement of the phase change module. A vertical arrangement is present when the longitudinal central axis of the housing which is preferably cylindrically configured extends substantially vertically, wherein the formulation "substantially" includes deviations of a maximum of 15° from the vertical direction.

According to a further development, the band-shaped phase change structure extends in several turns along the outer wall about the longitudinal central axis, wherein a gap is formed axially between adjacent turns. This gap is expediently dimensioned so that it interrupts a capillary effect of the phase change structure oriented parallel to the longitudinal central axis. Due to the gap, the capillary effect of the phase change structure does not act over the entire height of the housing but only over the height of the respective turn. As a result, a homogeneous distribution of the condensed working medium inside the phase change structure can be improved.

In another embodiment the phase change structure can comprise a plurality of band-shaped strips which each extend in the circumferential direction of the housing and are arranged adjacently along the outer wall parallel to the longitudinal central axis of the housing. This measure simplifies a modular structure within the sorption module since the size of the sorption in the longitudinal direction of the housing can be varied by the number of strips used. This embodiment is also preferably suitable for a vertical arrangement of the sorption module.

According to a further embodiment, a gap can be formed axially between adjacent strips which interrupts a capillary effect of the phase change structure oriented parallel to the longitudinal central axis. Here also the gap has the result that a homogeneous distribution of the working medium can be improved inside the individual strips.

In another embodiment, the phase change structure can comprise a plurality of band-shaped strips which each extend parallel to the longitudinal central axis of the housing and are arranged adjacently along the outer wall in the circumferential direction of the housing. This design also supports the modularity of the sorption module. The circumference of the housing can be determined via the number of strips used. This embodiment is particularly suitable for a horizontal arrangement of the sorption module. In a horizontal arrangement, the longitudinal central axis of the housing extends substantially horizontally, wherein the formulation "substantially" allows deviations of a maximum of 15° with respect to the horizontal direction.

According to an advantageous further development, a gap can be formed in the circumferential direction between adjacent strips which extends parallel to the longitudinal central axis. This measure can also interrupt a capillary effect of the phase change structure acting in the circumferential direction in order to support a homogeneous distribution of the liquid working medium within the individual strips of the phase change structure.

The band-shaped structure can optionally be divided into smaller segments in the axial direction. These axial segments can be spaced apart from one another with columns so that the capillary effect is also interrupted in the axial direction. This prevents any axial emergence of condensate from the phase change structure in the case of axial accelerations.

Expediently the aforesaid spring element can serve as a support for the phase change structure. For this purpose the phase change structure can be connected to the respective spring element in a suitable manner. Clip connections as well as solder connections and adhesive connections are feasible for example. Expediently the geometrical structure of the respective spring element is adapted to the geometrical structure of the phase change structure used in each case. If for example a helically configured phase change structure is used, the spring element can expediently also be configured as helical. If on the other hand several strip-shaped elements are provided for the phase change structure, several band-shaped spring elements can also be used.

According to another advantageous embodiment, the phase change structure can be configured as a capillary structure. With the aid of the capillary structure, it is achieved that during condensation operation of the phase change structure, the accumulating condensate is retained in the phase change structure so that it is available as homogeneously distributed as possible within the phase change structure for a subsequent evaporator operation. A suitable capillary structure is known, for example, from EP 1 918 668 B1, the contents of which are hereby incorporated by reference in its entirety.

The capillary effect of the phase change structure can be aligned parallel to the longitudinal central axis of the housing in the case of a vertical housing or in the circumferential direction of the housing in the case of a horizontal housing.

In another embodiment, the outer wall can have a supply connection for supplying the phase change path medium to the phase change path. In addition, the outer wall can have a drain connection for draining the phase change path medium from the phase change path which is spaced apart from the supply connection in a longitudinal direction of the housing which extends parallel to the longitudinal central axis of the housing. Preferably a distributor channel is formed in the cavity in the region of the supply connection, which expediently extends in the circumferential direction of the housing and thereby enables a distribution of the supplied phase change path medium over the annular or cylindrical phase change path extending substantially in the longitudinal direction of the housing. Additionally or alternatively a collector channel can be formed in the cavity in the region of the drain connection, which preferably extends in the circumferential direction of the housing and accordingly can receive the phase change path medium coming from the phase change path and supply it to the drain connection. Transversely to the longitudinal direction of the housing, a cross-section of the distributor channel and/or the collector channel is larger than a cross-section of the phase change path axially between distributor channel and collector channel.

The distance between outer wall and inner wall to form the cavity is comparatively small compared to the dimensions of the housing. In order to form this cavity, corresponding spacer elements can be arranged between inner wall and outer wall. Instead of separate spacer elements, however local elevations and/or beads are preferred, which are integrated in the inner wall or in the outer wall, e.g. in the form of imprints.

The cavity between inner wall and outer wall can alternatively also be filled with a structure which increases the passage of heat between phase change path medium and the inner wall. This can preferably be surface-increasing rib structures, turbulence plates or the like which are contacted on the inner wall in a heat-conducting manner.

A sorption temperature-control device according to the invention comprises at least one sorption module of the type described previously. Preferably the sorption temperature-control device can comprise a plurality of such sorption modules. The sorption temperature-control device is additionally provided with at least one sorption circuit in which the sorption path medium circulates and in which the respective sorption path of the respective sorption module is incorporated. Further, the sorption temperature-control device comprises at least one phase change circuit in which the phase change path medium circulates and in which the respective phase change path of the respective sorption module is incorporated.

The sorption structure is preferably formed from a porous solid. Expediently the sorption path is integrated in the sorption structure. For example, the sorption path can comprise a tube block formed by a plurality of parallel-running tubes, wherein the individual tubes are coated with a sorption material or are embedded in the sorption material.

Preferably the sorption path and the phase change path are fluidically separated from one another. Preferably the sorption path is fluidically separated from the working chamber. Preferably the phase change path is fluidically separated from the working chamber.

Preferably the sorption zone and the phase change zone are thermally decoupled from one another in order to minimize heat flows between the two zones. In order to minimize the conductive heat conduction, the double-walled housing region is spaced apart from the end regions of the cylinder in order to form the phase change path.

In order to minimize the heat transfer due to radiation of the hotter sorption zone to the respectively cooler phase change zone, the interposed gas chamber can contain one or more reflecting radiation shields.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are presented in the drawings and are explained in detail in the following description, where the same reference numbers relate to the same or similar or functionally the same components.

BRIEF DESCRIPTION OF THE DRAWINGS

In the figures, in each case schematically

DETAILED DESCRIPTION

Figure 1:
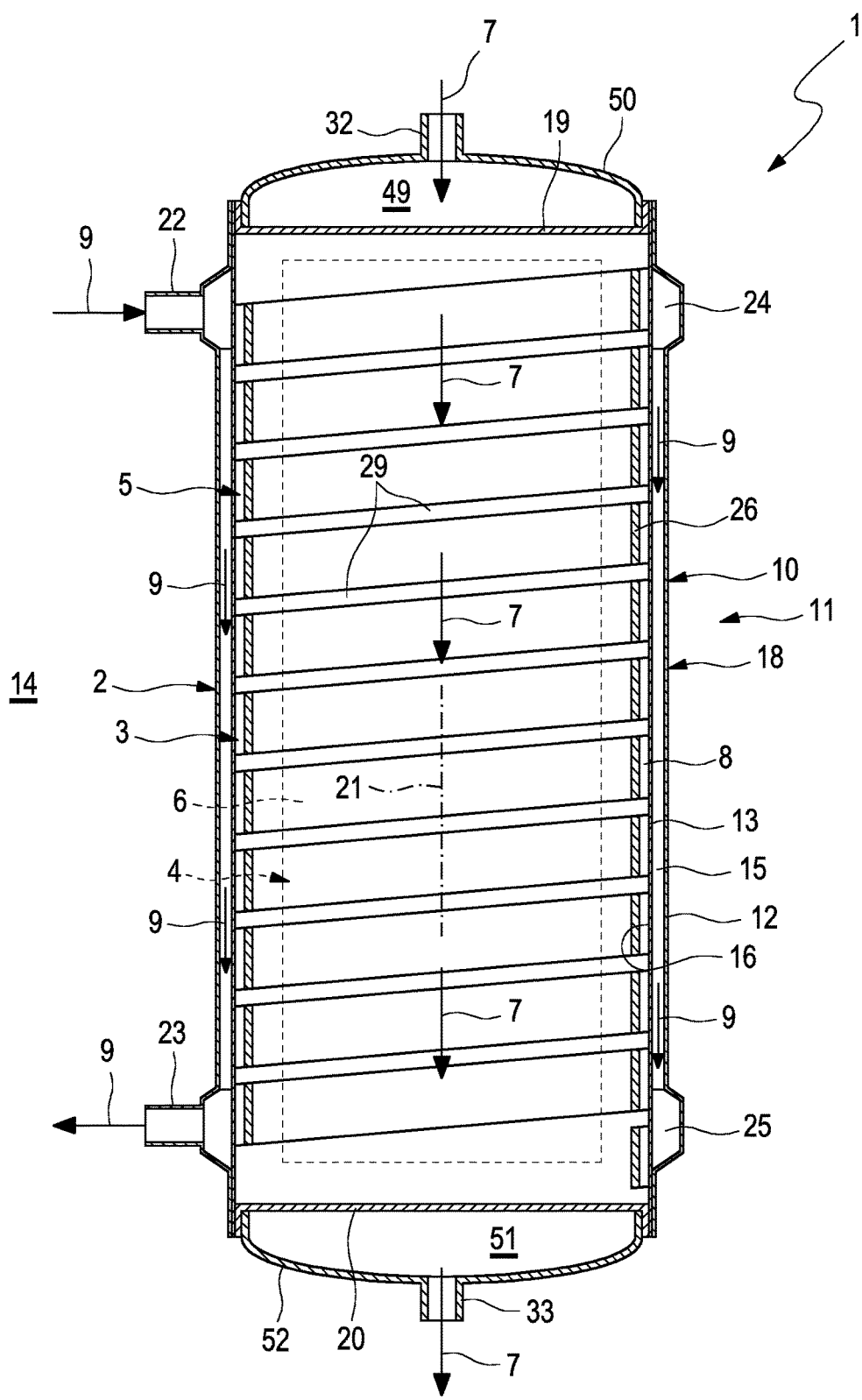
FIG. 1 shows a simplified longitudinal section of a sorption module with vertical arrangement.

According to FIGS. 1 to 8, a sorption module 1 comprises a housing 2 which encloses a working chamber 3. A sorption zone 4 as well as a phase change zone 5 are arranged in the working chamber 3, i.e. in the housing 2. A working medium not shown in detail is tightly enclosed in the working chamber 3, wherein this is reversibly displaceable between the sorption zone 4 and the phase change zone 5.

Located in the sorption zone 4 is a sorption structure 6 which is coupled to a sorption path 7 indicated by arrows in a heat-transmitting manner. The sorption path 7 is used to guide a sorption path medium not shown. Located in the phase change zone 5 is a phase change structure 8 which is coupled to a phase change path 9 indicated by arrows in a heat-transmitting manner. The phase change path 9 is used to guide a phase change path medium not shown here.

The housing 2 has an outer wall 10 which is configured to be double-walled in a section 11 so that the outer wall 10 in this section 11 comprises an outer wall 12 and an inner wall 13. The outer wall 10 delimits the working chamber 3 with respect to a surroundings 14 of the housing 2 or the sorption module 1. The outer wall 12 is exposed to the surroundings 14 whilst the inner wall 13 is exposed to the working chamber 3. An intermediate space or cavity 15 is formed between the outer wall 12 and the inner wall 13. Expediently this cavity 15 extends over the entire double-walled section 11. The phase change path 9 is now guided through this cavity 15 in such a manner that during operation of the sorption module 1 the phase change path medium flows through the cavity 15 and is guided axially or laterally therein through the inner wall 13 and the outer wall 12 and is thus guided through the outer wall 10 The cavity 15 thereby forms a component of the phase change path 9. The phase change zone 5 is arranged on an inner side 16 of the inner wall 13 facing the working chamber 3. Accordingly the phase change structure 8 is located on or adjacent to the inner side 16 of the inner wall 13.

In the preferred embodiment shown here, the housing 2 is configured cylindrically so that it has a jacket 18 running around in the circumferential direction 17 and two end bases 19, 20 axially at the end faces. The axial direction is here defined by a longitudinal central axis 21 of the housing 2. The circumferential direction 17 also relates to the longitudinal central axis 21. The axial direction in this case simultaneously correspond to a longitudinal direction of the housing 2. The jacket 18 forms or contains the double-walled section 11 of the outer wall 10 of the housing 2. In this respect the cavity 15 extends cylindrically. Furthermore the sorption zone 4 is enclosed in the circumferential direction 17 by the phase change zone 5. The double-walled section 11 or the jacket 18 encloses the phase change zone 5 in the circumferential direction 17. Finally the phase change path 9 encloses the phase change zone 5 in the circumferential direction 17. According to FIGS. 2 and 4, the cross-section of the housing 2 is circular cylindrical. Other cylinder forms are fundamentally also conceivable, for example, with an elliptical or oval cross-section.

The outer wall 12 can have a supply connection 22 for supplying the phase change path medium to the phase change path 9. Further, the outer wall 12 has a drain connection 23 for draining the phase change path material from the phase change path 9. The drain connection 23 and the supply connection 22 are spaced apart from one another in the longitudinal direction of the housing 2. For example, the supply connection 22 is located proximally to the end base 19 whilst the drain connection 23 is located proximally to the opposite other end base 20. In the area of the supply connection 22, a distributor channel 24 can be formed in the cavity 15 which extends in an annular closed manner in the circumferential direction 17. In the area of the drain connection 23 a collector channel 25 can be formed in the cavity 15, which extends in the circumferential direction 17. It can be seen that the cavity 15 is provided axially between distributor channel 24 and collector channel 25 with a significantly smaller cross-section through which flow can take place compared with the distributor channel 24 and the collector channel 25, wherein the cross-sections through which flow can take place are measured perpendicular to the longitudinal central axis 21.

The cavity 15 can be filled with a structure (not shown) which improves the passage of heat between the phase change path medium and the inner wall 13.

The phase change structure 8 is expediently configured as a capillary structure. In particular, a preferred orientation for the capillary effect can be provided inside this capillary structure which can expediently be oriented parallel to the longitudinal direction, i.e. parallel to the longitudinal central axis 21.

The gas chamber 35 can contain one or more (not shown) reflecting radiation shields which reduce the thermal irradiation of the sorption zone to the cooler phase change zone.

Figure 5:
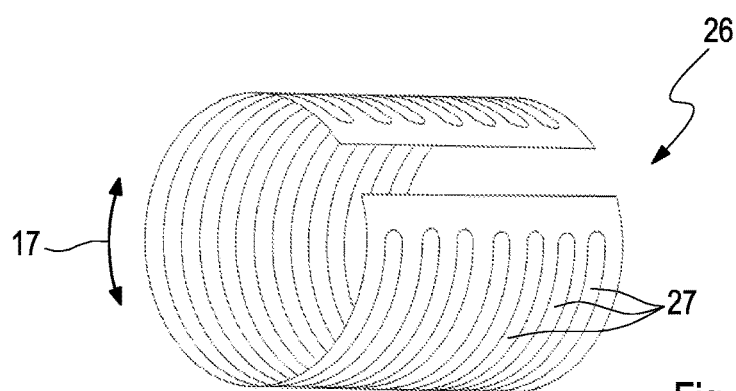
FIG. 5 shows an isometric view of a spring element for a sorption module.
Figure 6:
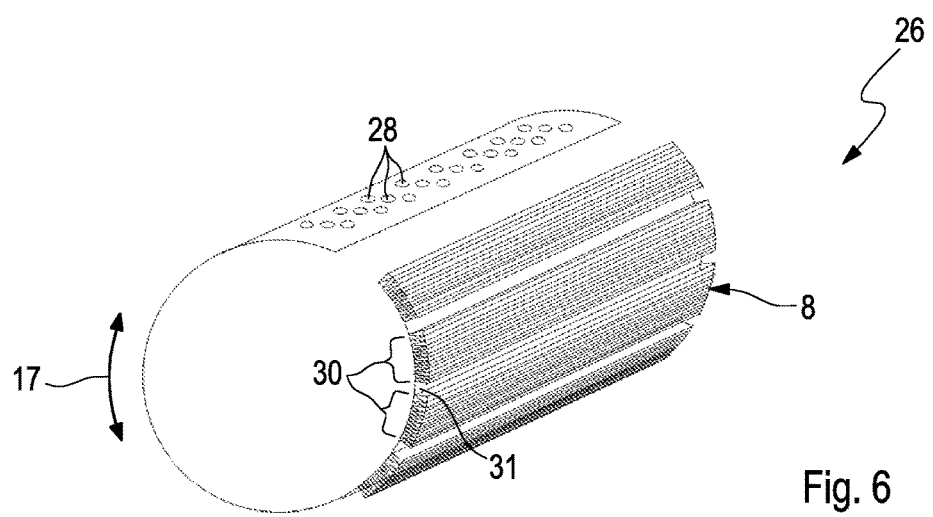
FIG. 6 shows an isometric view of the spring element in another embodiment with partially attached capillary structure packets.

The phase change structure 8 can be pressed against the inner wall 13 with the aid of at least one spring element 26, wherein direct contact between phase change structure 8 and inner wall 13 is preferred. In principle, however heat-conducting pastes and the like can be used in order to improve the heat transfer between phase change structure 8 and inner wall 13. FIGS. 5 and 6 show, purely as an example, examples for such spring elements 26 which are each configured as sheet metal bodies and are bent similarly to the housing 2 or its jacket 18 in the circumferential direction 17 around the longitudinal central axis 21. The spring element 26 shown in FIG. 5 and configured as a spring plate is perforated with a plurality of openings 27 which extend in the circumferential direction 17.

In the embodiment shown in FIG. 6 the spring element 26 is also perforated wherein a corresponding perforation is here designated by 28 and is achieved with the aid of a plurality of separate holes. The perforation 28 or the aforesaid openings 27 enable a fluidic communication of the interior sorption zone 4 with the exterior phase change zone 5 through the spring element 26. FIG. 6 also indicates parts of the phase change structure 8. The configuration of the phase change structure 8 is discussed in detail further below.

Instead of such a sheet-metal-shaped spring element 26, band-shaped spring elements 26 can also be used. It is feasible for example that several such band-shaped spring elements 26 are used which each extend in the circumferential direction 17 and are arranged adjacently in the longitudinal direction.

FIG. 1 shows an example in which a single band-shaped spring element 26 is used which is wound helically in the circumferential direction 17 about the longitudinal central axis 21.

Similarly to different embodiments of the spring element 26, the phase change structures 8 can also be configured differently. In the embodiment shown in FIG. 1, the phase change structure 8 is configured in a band shape similarly to the spring element 26 and is arranged so that it extends helically along the outer wall 10 about the longitudinal central axis 21. Expediently the dimensions of the spring element 26 and the phase change structure 8 are matched to one another so that they can be wound into the housing 2 jointly. If the phase change structure 8 extends as here over several turns along the outer wall 10, a winding is preferred in which a gap 29 is formed axially between adjacent turns. Similarly to the helical winding of the phase change structure 8, the gap 29 also extends helically. The gap 29 is dimensioned so that it interrupts a capillary effect of the phase change structure 8 oriented parallel to the longitudinal central axis 21.

In other embodiments, the phase change structure 8 can also comprise a plurality of band-shaped strips which each extend in the circumferential direction 17 and are arranged adjacently along the outer wall 10 in the longitudinal direction. Here also a gap 29 can expediently be provided between axially adjacent strips of the phase change structure 8 in order to interrupt the capillary effect of the phase change structure 8 in the longitudinal direction of the housing 2. Such a configuration and the configuration described previously with reference to FIG. 1 is preferred if the sorption module 1 is arranged vertically as indicated in FIG. 1 so that the longitudinal central axis 21 extends substantially vertically.

Figure 3:
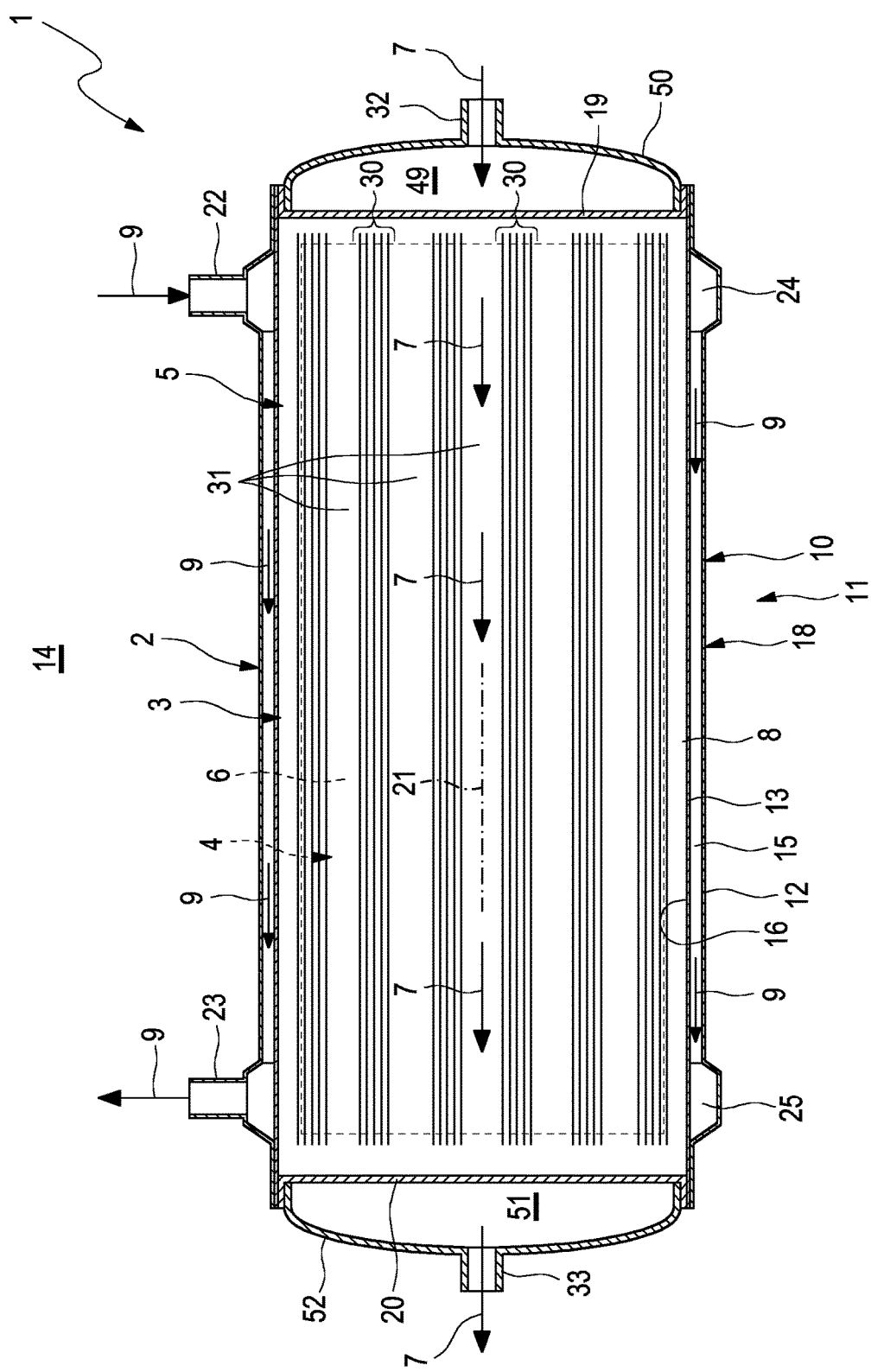
FIG. 3 shows a simplified longitudinal section of the sorption module with horizontal arrangement in another embodiment.
Figure 4:
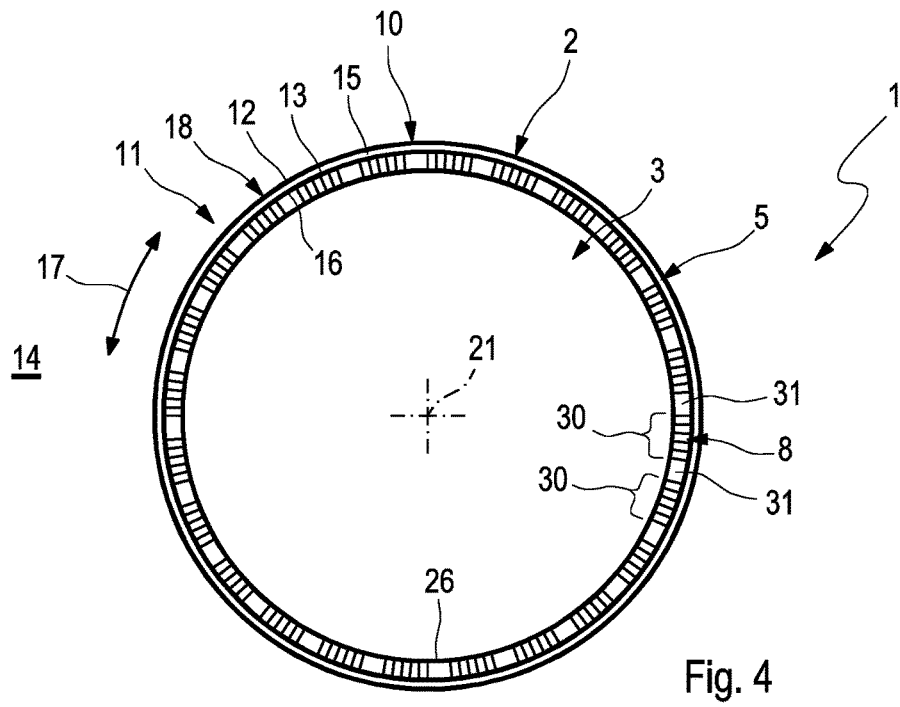
FIG. 4 shows a cross-section of the sorption module from FIG. 3.

In contrast to this, FIG. 3 shows a horizontal arrangement of the sorption module 1 in which the longitudinal central axis 21 extends substantially horizontally. In such a horizontal arrangement, the phase change structure 8 according to FIGS. 3, 4 and 6 can expediently comprise a plurality of band-shaped strips 30 which each extend parallel to the longitudinal central axis 21 and are arranged adjacent to one another along the outer wall 10 in the circumferential direction 17. Expediently it can also be provided here that respectively one gap 31 is now formed in the circumferential direction 17 between adjacent strips 30 wherein the respective gap 31 also extends parallel to the longitudinal central axis 21.

According to FIGS. 1 and 3, the housing 2 additionally has an inlet 32 for the sorption path medium which is connected to the sorption path 7 and an outlet 33 for the sorption path medium which is also connected to the sorption path 7. In the example, the inlet 32 is guided into a distributor chamber 49 which is delimited by the one end base 19 and a curved cover 50 whilst the outlet 33 at the opposite end of the housing 2 is connected to a collector chamber 51 which is delimited by the other end base 20 and another curved cover 52.

In order to minimize the conductive heat transfer between the distributor and collector chambers of the sorption zone and the distributor and collector chambers of the phase change zone, these regions are spaced apart from one another.

Figure 2:
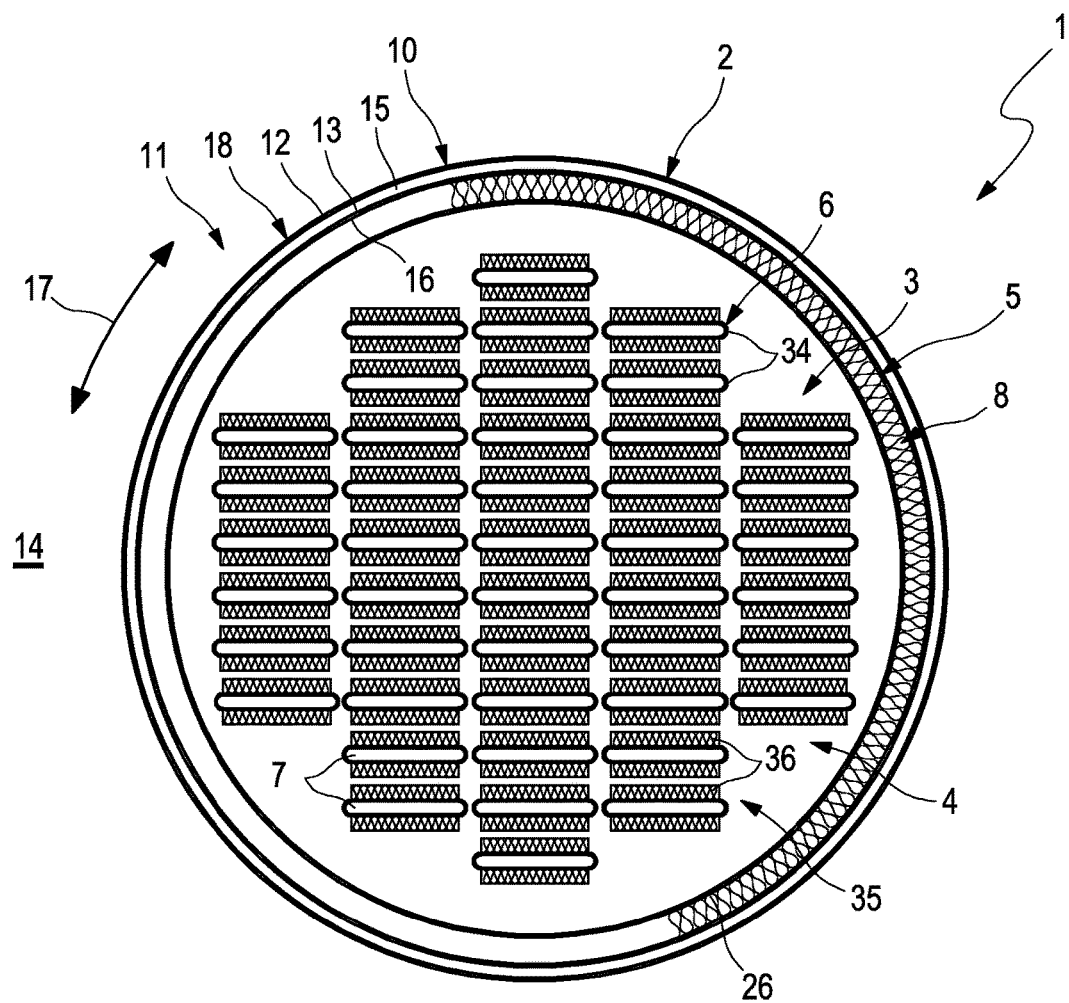
FIG. 2 shows a cross-section of the sorption module from FIG. 1.

According to FIG. 2, the sorption path 7 can be formed by a plurality of separate tube bodies 34 which are combined to form a tube block 35 in which they are arranged parallel to one another and adjacent to one another. The individual tubes 34 are enclosed by a sorption material 36 which forms the sorption structure 6 in its entirety. As a result, the sorption path 7 is integrated in the sorption structure 6. At the same time, an intensive heat-transmitting coupling is achieved. The sorption material 36 is preferably a solid. In principle, another suitable structure can be selected for the sorption structure 6. Only a part of the phase change structure 8 is indicated in FIG. 2. The indicated region only extends over a sixth of the circumference of the inner wall 13. Expediently however the phase change structure 8 extends over the entire circumference.

Figure 7:
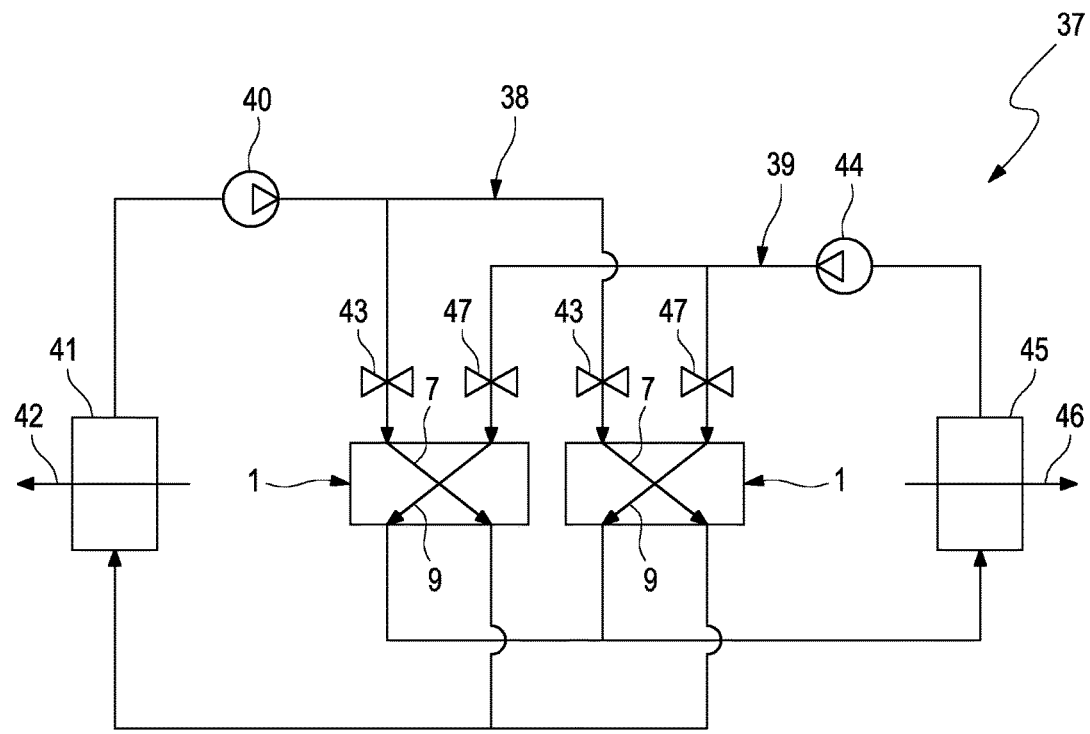
FIG. 7 shows a circuit-diagram-like schematic view of a sorption temperature-control device with a plurality of sorption modules.

According to FIG. 7, a sorption temperature-control device 37 can comprise a plurality of sorption modules 1 of the previously described type. Purely as an example, FIG. 7 shows two sorption modules 1. It is clear that in principle arbitrarily many sorption modules 1 can be provided. The sorption temperature-control device 37 additionally has at least one sorption circuit 38 in which the sorption path medium circulates and in which the sorption paths 7 of the sorption modules are incorporated. Furthermore the sorption temperature-control device 37 has at least one phase change circuit 39 in which the phase change path medium circulates and in which the phase change paths 9 of the sorption module 1 are incorporated.

The sorption circuit 38 can contain a pump 40 for driving the sorption path medium. Likewise at least one heat exchanger 41 can be provided via which, combined with a fluid stream 42, heat can be removed from the sorption circuit 38 or can be introduced therein. Control elements 43, for example, in the form of valve devices enable sorption path medium to be applied to the individual sorption modules 1 on the one hand independently and separately and on the other hand in a controlled manner with regard to the volume flow. Usually the sorption circuit 38 can be connected with valve means not shown here alternately to a high-temperature heat source or to a moderate-temperature heat sink according to the operating state of the sorption temperature-control device 37. In particular, at least two sorption circuits 38 can be provided for this purpose in order to simplify the coupling to the high-temperature heat source on the one hand or to the moderate-temperature heat sink on the other hand.

Similarly to this, the phase change circuit 39 can be provided with a pump 44 for driving the phase change path medium. Here also at least one heat exchanger 45 can be provided with the aid of which combined with a fluid stream 46, heat can be removed from the phase change circuit 39 or introduced therein. Control elements 47 can also be provided here, for example, in the form of valve devices in order to enable phase change path medium to be applied to the sorption modules 1 on the one hand separately and independently and on the other hand in a controlled manner with regard to the volume flow. Usually the phase change circuit 39 can also be connected with valve means not shown here alternately to a moderate-temperature heat sink or to a low-temperature heat source according to the operating state of the sorption temperature-control device 37. In particular, at least two phase change circuits 39 can be provided for this purpose in order to simplify the coupling to the low-temperature heat source on the one hand and to the moderate-temperature heat sink on the other hand.

The sorption circuit 38 and the phase change circuit 39 are each shown as closed circles in FIG. 7. It is clear that the sorption circuit 38 or the phase change circuit 39 can also be designed as an open circuit. It is also feasible to configure both the sorption circuit 38 and also the phase change circuit 39 as open circuits. In the case of several sorption circuits 38 and/or in the case of several phase change circuits 39 the same applies.

Figure 8:
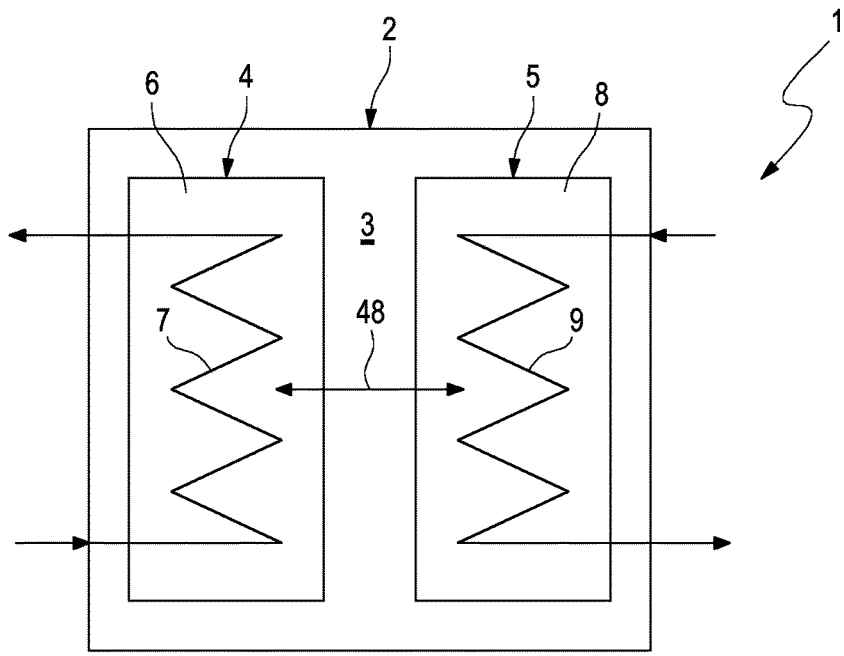
FIG. 8 shows a circuit-diagram-like schematic view of a conventional sorption module.

The operating mode of the sorption temperature-control device 37 or such a sorption module 1 is briefly explained in detail hereinafter with reference to FIG. 8. In principle, a distinction is made between a charging and a discharging phase which alternate cyclically with the result that the operation of the sorption temperature-control device 37 represents a cyclic process.

The cyclic process generally begins with a charging phase since the working medium in the thermally compensated state is largely located in the sorption zone 4 which can be attributed to the greater affinity of the sorption zone 4 for the working medium. During the charging phase, heat is supplied to the sorption structure 6 via the sorption path 7. This heat comes from a high-temperature heat source which can thus be cooled. As a result, the working medium desorbs from the sorption structure 6 and can be displaced in gaseous form from the sorption zone 4 to the phase change zone 5. The sorption structure 6 operates as a desorber during the charging phase. In the phase change zone 5 the gaseous working medium can be deposited on the phase change structure 8 wherein the phase change structure 8 operates as a condenser. The heat thereby released can be removed via the phase change path 9. The removed heat can be received by a moderate-temperature heat sink which can thereby be warmed. The charging phase can in principle be carried out until the highest possible proportion of the working medium depending on the temperature level is displaced into the phase change zone 5.

During a subsequent discharging phase, the sorption module 1 is operated so that the working medium which at the beginning of the discharging phase is largely located in the phase change zone 5, is displaced from the phase change zone 5 to the sorption zone 4. A corresponding displacement of the working medium is indicated by a double arrow in FIG. 8 and designated by 48. During the discharging phase heat is supplied via the phase change path 9 and via valve means not shown from a low-temperature heat source with the result that the phase change structure 8 acts as an evaporator for the working medium. As a result, the working medium evaporates and as a result of the pressure distribution established inside the working chamber 3, is passed in gaseous form from the phase change zone 5 to the sorption zone 4. The heat required for evaporation of the working medium brings about a cooling of the supplied phase change path medium. In the sorption zone 4 the vaporous working medium is absorbed by the sorption structure 6, resulting in the formation of adsorption heat. This is removed via the sorption path 7 and guided via valve means not shown in the usual manner to a moderate-temperature heat sink. The sorption structure 6 operates as adsorber during the discharging phase. The discharging phase can in principle be carried out until the highest possible proportion of the working medium depending on the temperature level is displaced from the phase change zone 5 to the sorption zone 4.

The invention claimed is:

1. A sorption module for a sorption temperature-control device, comprising:
   a housing enclosing a working chamber and including a sorption zone and a phase change zone arranged in the working chamber where a working medium is displaceable reversibly between the sorption zone and the phase change zone;
   a sorption structure arranged in the sorption zone and coupled to a sorption path in a heat-transmitting manner for guiding a sorption path medium;
   a phase change structure arranged in the phase change zone and coupled to a phase change path in a heat-transmitting manner for guiding a phase change path medium;
   an outer wall of the housing including a double-walled section arranged at least in a section to provide a cavity between an outer wall part and an inner wall part of the double-walled section;
   wherein the phase change path is guided through the cavity, and the phase change zone is arranged on an inner side of the inner wall part; and
   wherein the housing includes a jacket defining at least the double-walled section of the outer wall, the jacket including a supply connection disposed in the outer wall part for supplying the phase change path medium to the phase change path and a drain connection disposed in the outer wall part for draining the phase change path medium from the phase change path, the drain connection arranged spaced axially apart from the supply connection with respect to the longitudinal axis of the housing.

2. The sorption module according to claim 1, wherein:
   the sorption zone including the sorption structure arranged therein is enclosed by the phase change zone including the phase change structure arranged therein in a circumferential direction of a longitudinal axis defined by the housing;
   the double-walled section of the outer wall defining the cavity is structured to enclose the phase change zone in the circumferential direction; and
   the phase change zone is enclosed by the phase change path provided by the double-walled section in the circumferential direction.

3. The sorption module according to claim 1, wherein the housing has a cylindrical shape and the jacket surrounds the phase change zone circumferentially to a longitudinal axis of the housing and extends axially to the longitudinal axis between two end bases disposed at axially opposite end faces of the working chamber.

4. The sorption module according to claim 1, further comprising at least one spring element provided to pretension the phase change structure against the inner wall part of the double-walled section.

5. The sorption module according to claim 4, wherein:
   the at least one spring element is a spring strap wound in a circumferential direction of the housing around a longitudinal central axis of the housing in a helical manner; or
   the at least one spring element is a spring plate bent in a circumferential direction of the housing about a longitudinal central axis of the housing.

6. The sorption module according to claim 4, wherein the at least one spring element is disposed radially between the phase change structure and the sorption structure with respect to a longitudinal axis of the housing, and wherein the at least one spring element is perforated with a plurality of openings to provide a fluidic connection from the sorption zone to the phase change zone through the at least one spring element in a radial flow path.

7. The sorption module according claim 4, wherein the at least one spring element is arranged radially between the sorption structure and the phase change structure with respect to a longitudinal axis of the housing, and wherein the phase change structure is configured as a capillary structure including a plurality of capillary structure packets pre-tensioned via the at least one spring element radially outwards against the inner side of the inner wall part of the double-walled section.

8. The sorption module according to claim 1, wherein the phase change structure has a band shape and extends helically along the outer wall around a longitudinal central axis of the housing.

9. The sorption module according to claim 8, wherein the phase change structure having the band-shape extends in plural turns along the outer wall about the longitudinal central axis, and wherein a gap is defined axially between adjacent turns and interrupts a capillary effect of the phase change structure oriented parallel to the longitudinal central axis.

10. The sorption module according to claim 1, wherein the phase change structure includes a plurality of band-shaped strips extending in a circumferential direction of the housing, the plurality of band-shaped strips arranged adjacently along the outer wall in a longitudinal direction of the housing running parallel to a longitudinal central axis of the housing.

11. The sorption module according to claim 10, wherein a gap is defined axially between adjacent band-shaped strips of the plurality of band-shaped strips that interrupts a capillary effect of the phase change structure oriented parallel to the longitudinal central axis of the housing.

12. The sorption module according to claim 1, wherein the phase change structure includes a plurality of band-shaped strips extending parallel to a longitudinal central axis of the housing, the plurality of band-shaped strips arranged adjacently along the outer wall in a circumferential direction of the housing.

13. The sorption module according to claim 12, wherein a gap is defined between adjacent band-shape strips of the plurality of band-shaped strips in the circumferential direction of the housing, the gap extending parallel to the longitudinal axis between adjacent band-shape strips of the plurality of band-shaped strips.

14. The sorption module according to claim 1, wherein the sorption structure is a sorption material and the sorption path is provided by a plurality of tube bodies arranged in a tube block, and wherein the plurality of tube bodies are enclosed by the sorption material.

15. A sorption temperature-control device, comprising:
at least one sorption module, the at least one sorption module including:
a housing defining a longitudinal axis and enclosing a working chamber, the housing including a sorption zone and a phase change zone arranged in the working chamber where a working medium is displaceable reversibly between the sorption zone and the phase change zone;
a sorption structure arranged in the sorption zone and coupled to a sorption path in a heat-transmitting manner for guiding a sorption path medium;
a phase change structure arranged in the phase change zone and coupled to a phase change path in a heat-transmitting manner for guiding a phase change path medium;
the housing including an outer wall surrounding the working chamber in a circumferential direction of the longitudinal axis, the outer wall including a double-walled section defining a cavity extending axially to the longitudinal axis between an outer wall part and an inner wall part of the double-walled section;
wherein the phase change path is guided through the cavity, and the phase change zone including the phase change structure disposed therein is arranged on an inner side of the inner wall part, wherein the inner side of the inner wall part is exposed to the working chamber and an outer side of the outer wall part is exposed to an external surrounding of the housing;
at least one sorption circuit, wherein the sorption path medium circulates in the at least one sorption circuit and the sorption path of the at least one sorption module is incorporated into the at least one sorption circuit;
at least one phase change circuit, wherein the phase change path medium circulates in the at least one phase change circuit and the phase change path of the at least one sorption module is incorporated into the at least one phase change circuit; and
wherein the housing includes a jacket defining at least the double-walled section of the outer wall, the jacket including a supply connection disposed in the outer wall part for supplying the phase change path medium to the phase change path and a drain connection disposed in the outer wall part for draining the phase change path medium from the phase change path, the drain connection arranged spaced axially apart from the supply connection with respect to the longitudinal axis of the housing.

16. The sorption temperature-control device according to claim 15, wherein the at least one sorption module further includes a spring element arranged radially between the sorption structure and the phase change structure with respect to the longitudinal axis, and wherein the spring element pre-tensions the phase change structure against the inner wall part of the double-walled section.

17. The sorption temperature-control device according to claim 16, wherein the phase change structure has a band shape and extends helically along the outer wall around a longitudinal central axis of the housing.

18. The sorption temperature-control device according to claim 16, wherein the phase change structure includes a plurality of band-shaped strips arranged along the inner wall part of the double-walled section.

19. A sorption module for a sorption temperature-control device, comprising:
a housing enclosing a working chamber and including a sorption zone and a phase change zone arranged in the working chamber where a working medium is displaceable reversibly between the sorption zone and the phase change zone;
a sorption structure arranged in the sorption zone and coupled to a sorption path in a heat-transmitting manner for guiding a sorption path medium;
a phase change structure arranged in the phase change zone and coupled to a phase change path in a heat-transmitting manner for guiding a phase change path medium;
an outer wall of the housing including a double-walled section arranged at least in a section to provide a cavity between an outer wall part and an inner wall part of the double-walled section, wherein the phase change path is guided through the cavity, and the phase change zone is arranged on an inner side of the inner wall part;

the outer wall part of the double-walled section including a supply connection for supplying the phase change path medium to the phase change path and a drain connection for draining the phase change path medium from the phase change path, the drain connection arranged spaced apart from the supply connection in a longitudinal direction of the housing; and at least one of a distributor channel is defined in the cavity in a region of the supply connection that extends in a circumferential direction of the housing, and a collector channel is defined in the cavity in a region of the drain connection that extends in a circumferential direction of the housing.

* * * * *